(12) United States Patent
Tatai et al.

(10) Patent No.: US 8,167,211 B2
(45) Date of Patent: May 1, 2012

(54) CARD CARRYING AND PUSHING OUT DEVICE

(75) Inventors: Toshio Tatai, Nagano (JP); Keiji Ohta, Nagano (JP); Takeki Watanabe, Nagano (JP)

(73) Assignee: Nidec Sankyo Corporation (JP)

( * ) Notice: Subject to any disclaimer, the term of this patent is extended or adjusted under 35 U.S.C. 154(b) by 888 days.

(21) Appl. No.: 11/520,974

(22) Filed: Sep. 14, 2006

(65) Prior Publication Data

US 2007/0069031 A1    Mar. 29, 2007

(30) Foreign Application Priority Data

Sep. 26, 2005   (JP) ................................ 2005-278397
Jun. 7, 2006    (JP) ................................ 2006-158020

(51) Int. Cl.
*G06K 7/00*    (2006.01)

(52) U.S. Cl. ...................................................... 235/486

(58) Field of Classification Search ........... 235/483–486
See application file for complete search history.

(56) References Cited

U.S. PATENT DOCUMENTS

| | | | | |
|---|---|---|---|---|
| 5,773,805 A | * | 6/1998 | Nakamura et al. | 235/441 |
| 5,806,659 A | * | 9/1998 | Middelberg et al. | 198/731 |
| 6,345,760 B1 | * | 2/2002 | Eason et al. | 235/380 |
| 2005/0023342 A1 | * | 2/2005 | Yamamiya | 235/381 |
| 2006/0102720 A1 | * | 5/2006 | Suzuki et al. | 235/439 |

FOREIGN PATENT DOCUMENTS

| | | |
|---|---|---|
| JP | 09-185685 | 7/1997 |
| JP | 10-124620 | 5/1998 |
| JP | 10-124620 A | 5/1998 |
| JP | 10-154209 | 6/1998 |
| JP | 2004-59181 A | 2/2004 |

* cited by examiner

*Primary Examiner* — Daniel Hess
*Assistant Examiner* — Matthew Mikels
(74) *Attorney, Agent, or Firm* — Cantor Colburn LLP

(57) ABSTRACT

A card carrying device may include a stacker in which a plurality of cards is stacked, a card pushing-out member for engaging with the rear edge of a card at a lowest position of the cards to push the card at the lowest position outside from the stacker, a carrying-out roller for carrying the card outside from the stacker, and a card pushing-up member for pushing up other cards stacked on the card at the lowest position in an upper direction in a period after the carrying-out roller comes in contact with the card at the lowest position and before the card at the lowest position has been carried outside from the stacker.

11 Claims, 8 Drawing Sheets

[Fig. 1]
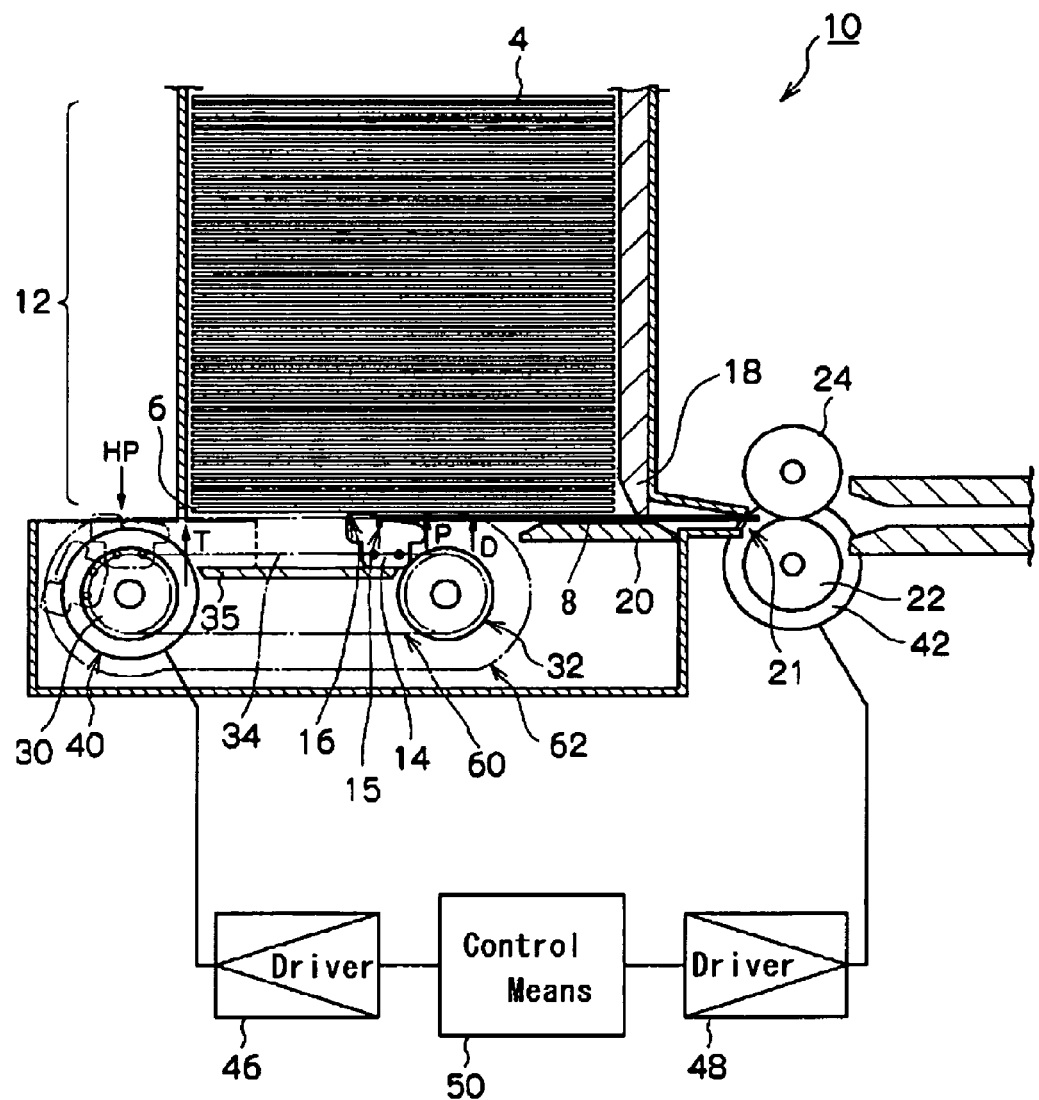

[Fig. 2]
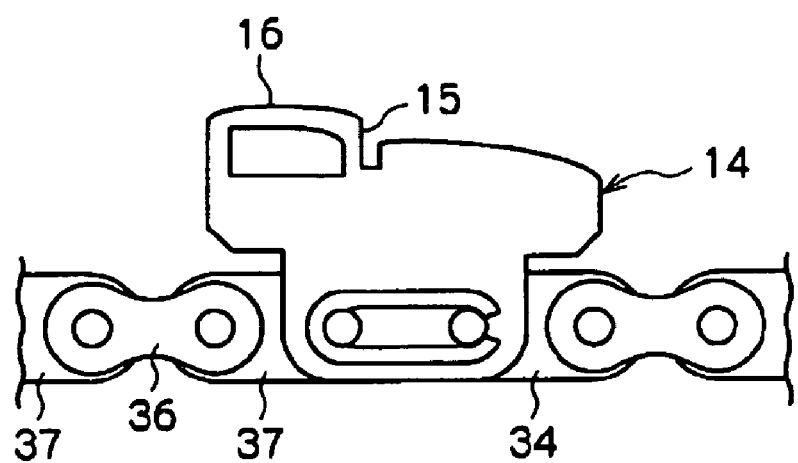

[Fig. 3]
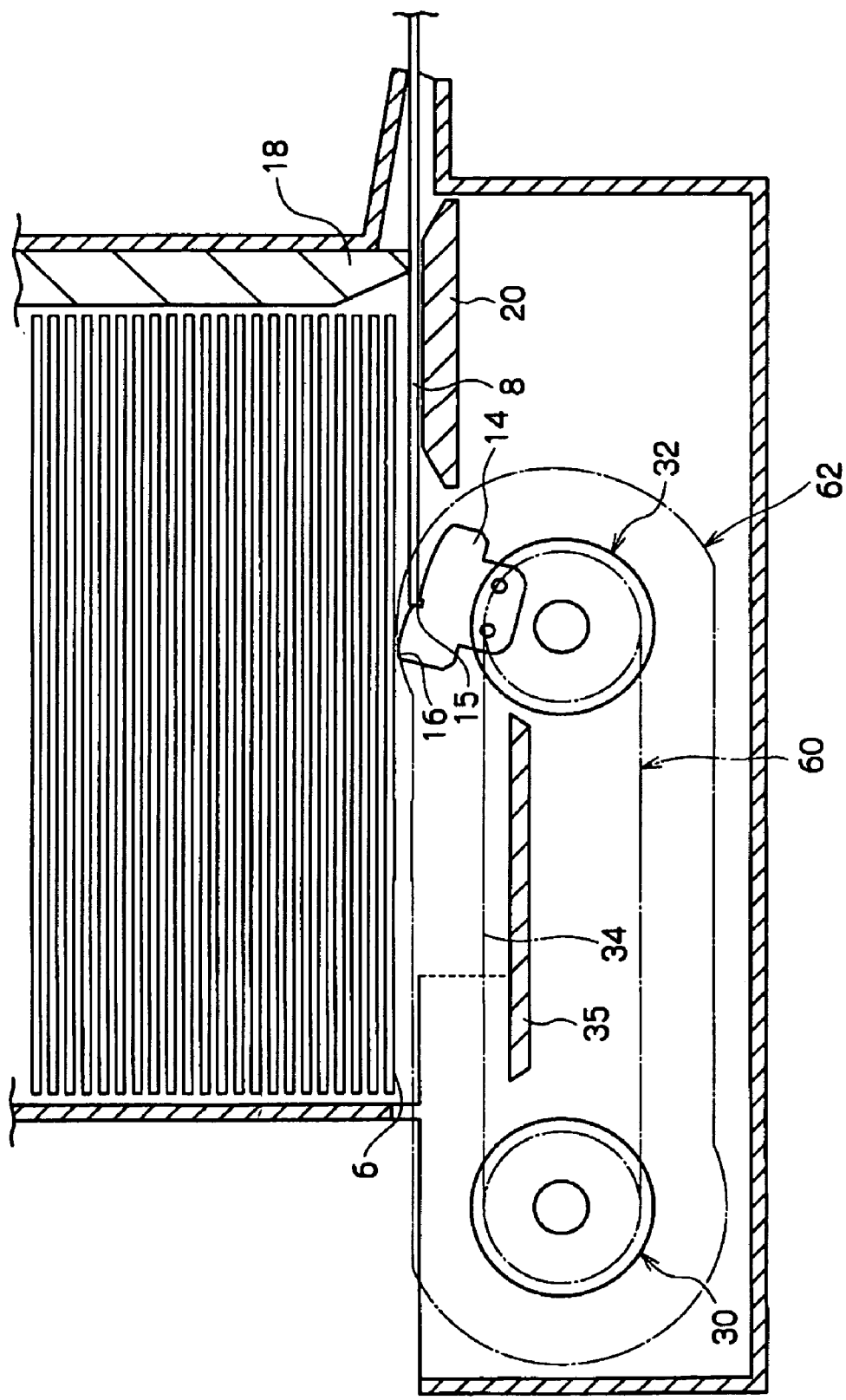

[Fig. 4]
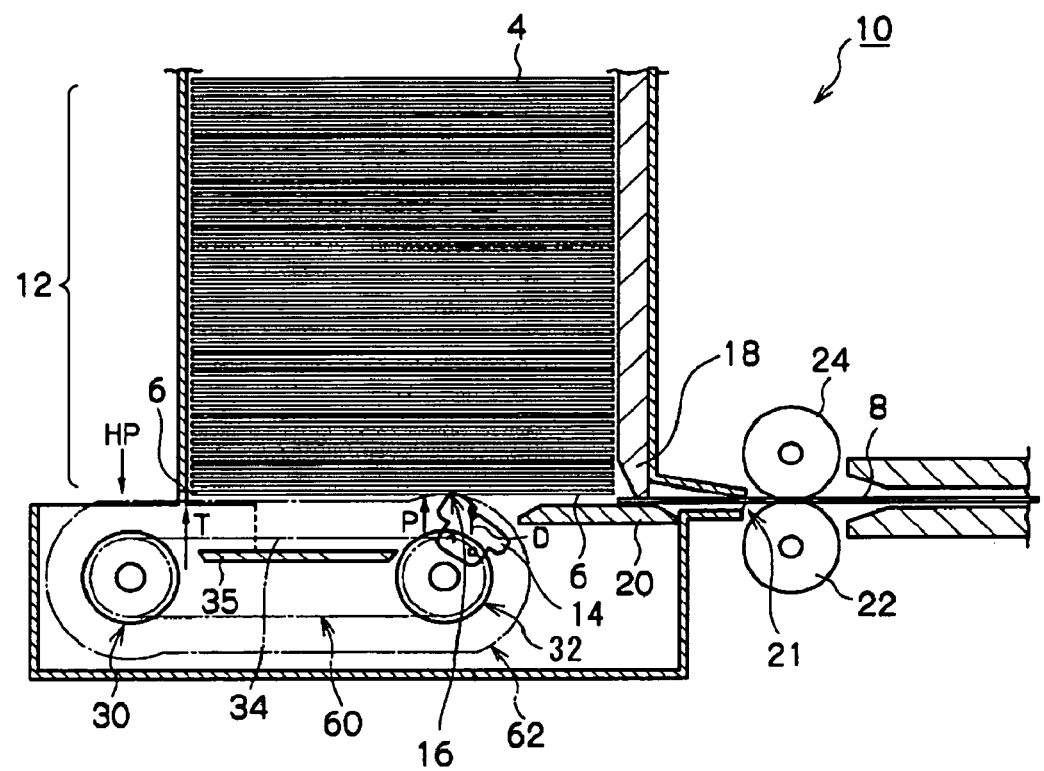

[Fig. 5]
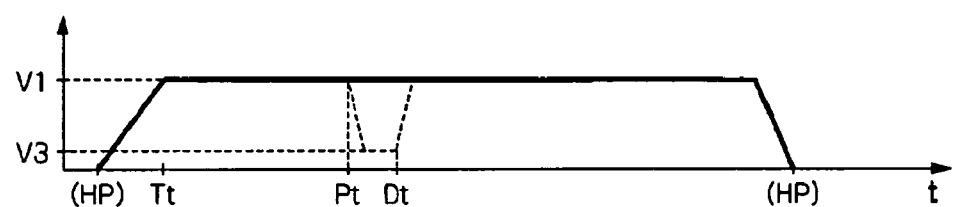
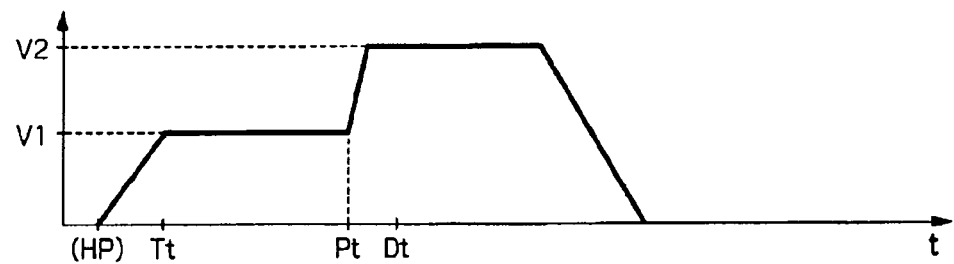

[Fig. 6]
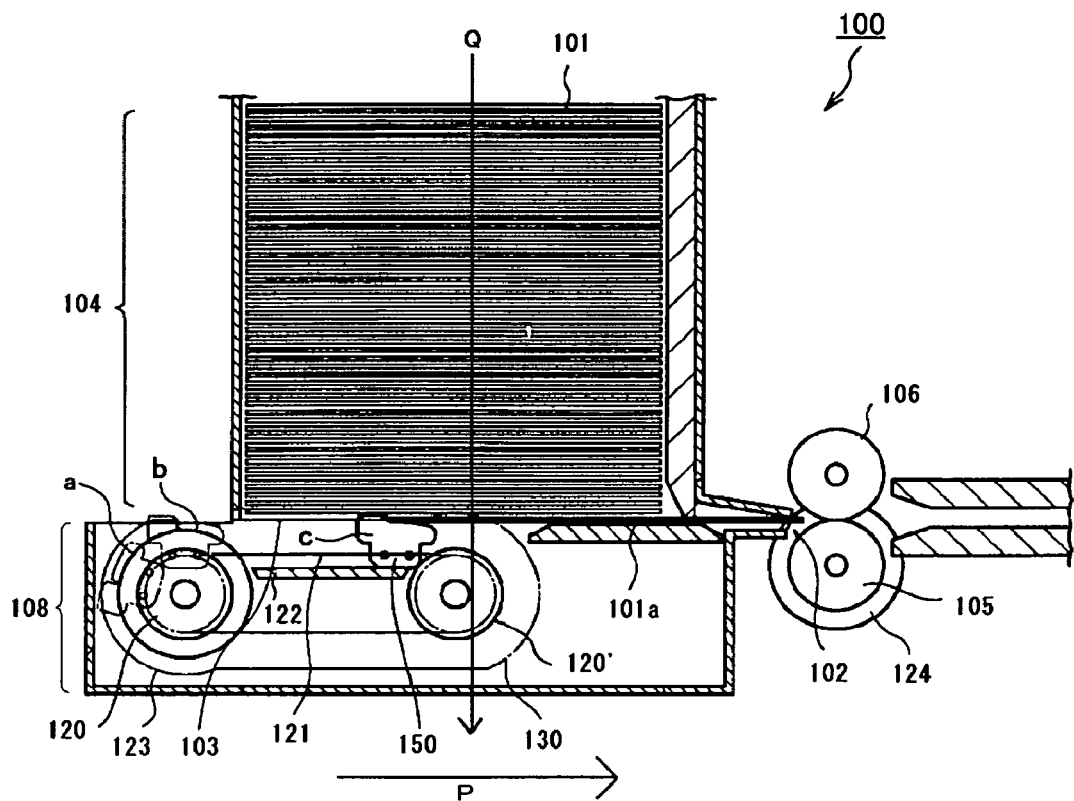
[Fig. 7]
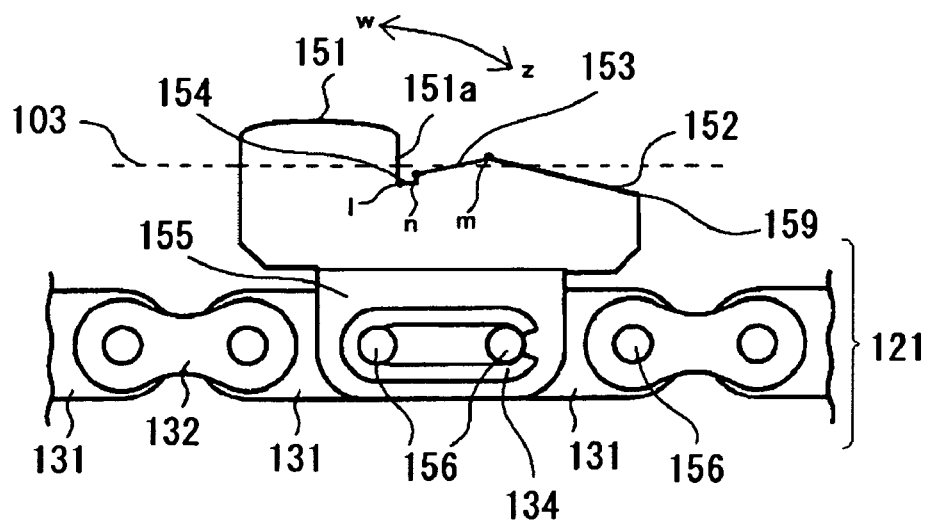

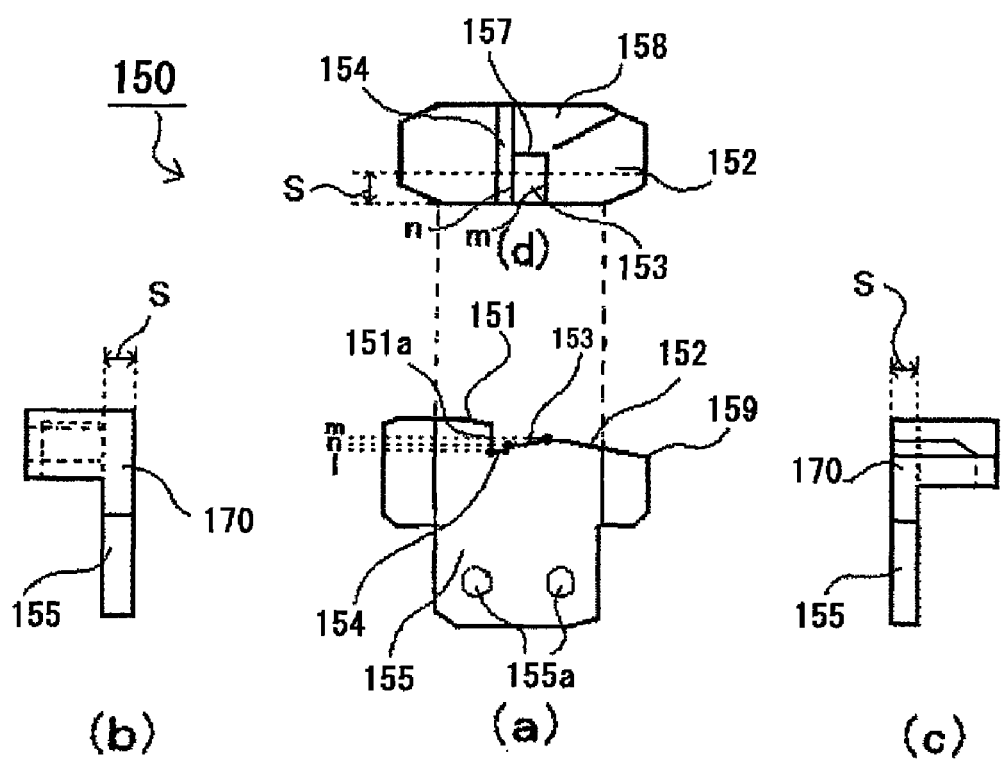
[Fig. 8]

[Fig. 9]
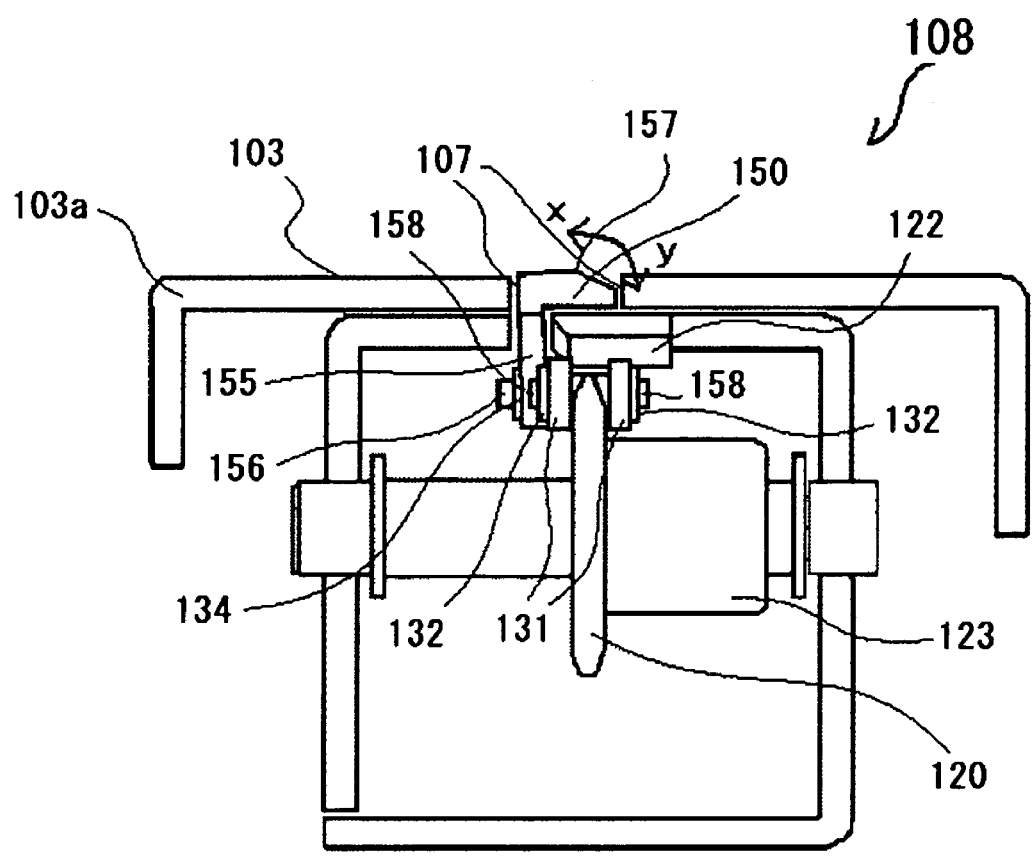

CARD CARRYING AND PUSHING OUT DEVICE

CROSS REFERENCE TO RELATED APPLICATION

The present invention claims priority under 35 U.S.C. §119 to Japanese Application No. 2005-278397 filed Sep. 26, 2005 and Japanese Application No. 2006-158020 filed Jun. 7, 2006, both of which are incorporated herein by reference.

FIELD OF THE INVENTION

An embodiment of the present invention may relate to a card carrying device in which a card-shaped medium (hereinafter, referred to as a card) is accurately carried out one by one from a stacker where a number of cards is stacked. Further, an embodiment of the present invention may relate to a card-shaped medium carrying device (hereinafter, referred to as a card carrying device) for carrying out a card that is accommodated in a stacker in a card-shaped medium processing device or the like.

BACKGROUND OF THE INVENTION

A card carrying devices for carrying out stacked cards successively has been known which includes a stacker where a plurality of cards whose thickness is uneven like an embossed card is stacked, and a card carrying-out means having a card carrying-out portion which is arranged so as to face the stacker in a freely reciprocated manner and which is capable of engaging with the rear edge of a card at the lowest position to carry out the card from a gate opening (see, for example, Japanese Patent Laid-Open No. Hei 10-154209 (First Reference)). The card carrying device includes a vibration applying member which causes the under face of a succeeding lowest card stacked in the stacker to push up and drop down to apply vibration to the cards in the stacker during a time period after the card carrying-out portion has finished card carrying-out operation and before it starts the next card carrying-out operation. In this manner, a card can be ejected without being caught by a card positioned on its upper face.

In the card carrying device described in the First Reference, whenever a card at the lowest position is carried out one by one, vibration is applied to other stacked cards. Therefore, remaining cards in the stacker go down to the lowest position without being caught by the inner wall face of the stacker. Therefore, according to this card carrying device, it is thought that cards can be accurately carried out one by one even when the card is a card whose thickness is uneven like an embossed card. In this card carrying device, the card which is carried to the gate opening is further carried with a pair of rollers which are disposed near the gate opening.

Further, a card carrying-out mechanism for carrying a plurality of cards which is stacked and accommodated in a stacker in a card reader as described above has been conventionally used. In the card carrying-out mechanism, a card carrying-out part for protruding toward a card from a bottom face of the stacker is provided and a card carrying-out member is moved in a card carrying-out direction by means of that the card carrying-out part is driven by a chain or a feeding screw shaft which is connected to a drive source, and a plurality of cards stacked in the stacker is carried out one by one from the lowest position in the carrying-out direction toward the gate opening.

In the structure described above, a card carrying-out member which is provided with an upper face part for abutting with the under face of a rear edge of a card to be carried out and an engagement part for engaging with the rear edge of the card is used to carry out the card to the outside of the stacker (see, for example, Japanese Patent Laid-Open No. Hei 9-185685 (Second Reference) and Japanese Patent Laid-Open No. Hei 10-124620 (Third Reference)).

However, in the card carrying device as described in the First Reference, the vibration applying member for pushing up other stacked cards from the underside moves downward along a sprocket for driving the vibration applying member before a card at the lowest position has been completely carried out from the stacker by rollers. Therefore, other stacked cards drop down and press the card at the lowest position that is on the way of being carried-out and thus a frictional force applied to the card at the lowest position is increased because a load is applied from the upper side and, as a result, the card may not be carried. Especially, in a card formed in a flat surface like a card without embossment, a frictional force becomes larger due to the cards being stacked and thus a malfunction that the rollers are idled and the card is not carried out may occur.

In order to prevent the malfunction, the number of cards to be stacked in the stacker is required to be reduced and thus cards are required to be put into the stacker frequently.

Further, in the card carrying-out member of the card carrying device described in the Second Reference, since the rear edges of cards are repeatedly engaged with the engagement part of the card carrying-out member, the engagement part wears. Therefore, dusts such as wear pieces of cards may be jammed in a portion where the upper face part of the card carrying-out member and its engagement part intersect each other at a right angle. Alternatively, the engagement part may be worn by engagement with the rear edge of a card to cause the engagement part to be formed in a round shape. As a result, engagement between the engagement part of the card carrying-out member and the rear edge of a card may not be performed surely.

Further, a card carrying-out operation in the above-mentioned card carrying device is performed such that the card carrying-out member is fixed to a driving member, which is structured with complicated components such as a guide plate, a feed screw shaft and a guide bush, and the card carrying-out member is reciprocatedly moved in the card carrying-out direction. Therefore, the card carrying device becomes complicated and the number of component parts and the size of the device are increased.

On the other hand, in the card carrying device described in the Third Reference, vibration occurs in the device at the time of driving of a drive source which drives a card carrying-out member. In order to prevent the shift of a position or an attitude of a card due to the vibration, a load member is arranged for applying an urging force which is stronger than a carrying-out force of a card carrying-out member in a direction perpendicular to a card carrying-out direction or from the under side of a bottom face of a stacker, and the position or the attitude of the card is corrected near the gate opening and the card is carried out. However, since the load member which is an extra structure is used, the number of component parts is increased and the structure of the device becomes complicated and, in addition, cost increases.

SUMMARY OF THE INVENTION

In view of the problems described above, an embodiment of the present invention may advantageously provide a card carrying device which is capable of surely carrying out a card one by one from a stacker in which a number of cards are stacked.

Also, another embodiment of the present invention may advantageously provide a card carrying device with a simple structure and without increasing its size and number of component parts, which is capable of surely carrying out a card even when a position or an attitude of the card is varied by vibration during the card is carried.

Thus, according to an embodiment of the present invention, there may be provided a card carrying device including a stacker in which a plurality of cards is stacked, a card pushing-out member which is arranged so as to face a bottom part of the stacker for engaging with a rear edge of a card at the lowest position of a plurality of the cards to push the card at the lowest position outside from the stacker, a carrying-out roller which is disposed in a direction that the card at the lowest position is carried out and which is capable of coming in contact with the card at the lowest position which is being pushed out by the card pushing-out member to carry the card at the lowest position outside from the stacker, and a card pushing-up member which is arranged so as to face the bottom part of the stacker for pushing up other cards stacked on the card at the lowest position in an upper direction in a period after the carrying-out roller comes in contact with the card at the lowest position to start a carrying-out operation and before the card at the lowest position has been carried outside from the stacker.

According to an embodiment of the present invention, a card pushing-up member is provided for pushing up a number of cards which are stacked on the card at the lowest position in an upper direction. And, the pushing-up operation to other cards by the card pushing-up member is performed in a period after the carrying-out roller comes in contact with the card at the lowest position to start a carrying-out operation and before the card at the lowest position has been carried out outside from the stacker. As a result, other cards do not drop and overlap on the card at the lowest position that is being carried out, and the card at the lowest position can be surely carried out by the carrying-out roller. Therefore, according to this card carrying device, a card can be surely carried out even when not only flat cards generating a large frictional force due to their stacking are stacked but also embossed cards are stacked.

In accordance with an embodiment of the present invention, the card carrying device is preferably provided with a control mechanism which increases a rotating speed of the carrying-out roller to carry out the card at the lowest position outside from the stacker after the card pushing-up member has pushed up other cards in an upper direction.

According to the structure as described above, the card carrying device is provided with a control mechanism which increases the rotating speed of the carrying-out roller to carry out the card at the lowest position outside from the stacker after the card pushing-up member has pushed up other cards in an upper direction. Therefore, the card at the lowest position can be carried out with a short time from the stacker. As a result, pushing-up time by the card pushing-up member can be shortened.

In the card carrying device in accordance with an embodiment, the card pushing-out member and the card pushing-up member are integrated with each other to be formed as one piece of a card pushing out-and-up member. In this case, it is preferable that the card pushing-up member is formed on a rear side of the card pushing-out member in a card pushing-out direction. Specifically, the card pushing out-and-up member may be structured so as to include a pawl shaped pushing-out part for engaging with a rear edge of the card at the lowest position and a pushing-up part which is gradually protruded rearward from the pushing-out part. In this case, the card pushing out-and-up member is structured such that the card pushing out-and-up member functions as a card pushing-out member until the card at the lowest position comes in contact with the carrying-out roller and functions as a card pushing-up member after the card at the lowest position has come in contact with the carrying-out roller.

According to the structure as described above, one piece of member is commonly used as the card pushing-out member and as the card pushing-up member, and thus the structure of the card carrying device can be simplified.

In the card carrying device in accordance with an embodiment, the card pushing out-and-up member is attached to a chain which is stretched between a plurality of sprockets and, when the card pushing out-and-up member moves between the sprockets, the card pushing out-and-up member functions as a card pushing-out member and, after the card pushing out-and-up member has moved between the sprockets as the card pushing-out member and when the card pushing out-and-up member begins to turn around a sprocket which is disposed on a near side to the carrying-out roller, the card pushing out-and-up member functions as a card pushing-up member.

According to the structure as described above, since the card pushing out-and-up member is attached to and driven by a chain, a card pushing-out operation and a card pushing-up operation can be performed with a simple structure.

In the card carrying device in accordance with an embodiment, it is preferable that a pair of facing members is disposed on the carrying-out roller side of the bottom part of the stacker for permitting only one piece of the card at the lowest position to pass through when the card at the lowest position is pushed to the carrying-out roller.

Further, according to another embodiment of the present invention, there may be provided a card carrying device including a stacker in which a plurality of cards are stacked, and a card carrying-out member which is disposed so as to face an aperture of a bottom face of the stacker for engaging with a rear edge of a card at the lowest position of a plurality of the cards to carry out the card at the lowest position from a gate opening of the stacker. In this embodiment, the card carrying-out member includes an engagement part which is capable of protruding into the stacker from the bottom face for engaging with the rear edge of the card at the lowest position, a first guide part which is formed in a face intersecting the bottom face for guiding the rear edge of the card at the lowest position to the engagement part from a direction opposite to a card stacked direction, and a second guide part which is formed in a face with an inclined angle that is smaller than an inclined angle of the first guide part to the bottom face for guiding the rear edge of the card at the lowest position to the engagement part from the first guide part.

According to this embodiment, since the card carrying-out member includes the first guide part which is formed in a plane intersecting the bottom face, the card at the lowest position can be surely contacted with the first guide part and slid. Further, the second guide part is formed in a face with an inclined angle that is smaller than an inclined angle of the first guide part to the bottom face for guiding the rear edge of the card at the lowest position to the engagement part. Therefore, the card at the lowest position can be surely engaged with the engagement part of the card carrying-out member and thus occurrence of jamming of the card near the gate opening is prevented and the card can be surely carried out.

In accordance with an embodiment, it is preferable that the card carrying device includes a driving member with a play for moving the card carrying-out member in a card carrying-out direction. In this embodiment, the card carrying-out member is attached to the driving member so as to be capable of wobbling due to the play of the driving member in a card carrying-out direction and in a card widthwise direction, and the card carrying-out member is provided with a run-off part for preventing the rear edge of the card from disengaging with the engagement part due to the wobbling in the card carrying-out direction and in the card widthwise direction. The driving member is preferably a chain which comprises a plurality of connected links. When a chain is used, the play that the chain is provided with in itself can be used as it is.

According to the structure as described above, the card carrying-out member is attached to the driving member so as to be swingable in the card carrying-out direction and in the card widthwise direction and thus effect of the weight of the stacked cards and effect of vibration occurred at the time of driving in the device can be absorbed. Further, since the run-off part is formed in the card carrying-out member, the card can be surely carried out without causing the rear edge of the card to be disengaged from the engagement part.

In this specification, the card carrying-out direction means a traveling direction of a card at the lowest position when the card is carried out by the card carrying-out member to the gate opening from the stacker. Further, the card widthwise direction means a short length widthwise direction of a card which is perpendicular to the card carrying-out direction.

In accordance with an embodiment, it is preferable that the second guide part is formed on one side of the card carrying-out member with respect to a center line along the card carrying-out direction, and a cutout part which is inclined toward underside from the second guide part is formed on the other side of the card carrying-out member. The cutout part may be preferably formed as the run-off part.

According to the structure as described above, the second guide part is formed on one side of the card carrying-out member with respect to a center line along the card carrying-out direction, and a cutout part which is inclined toward underside from the second guide part is formed on the other side of the card carrying-out member. Therefore, even when the card carrying-out member is inclined in the card widthwise direction, the under face of the card at the lowest position is capable of contacting with the cutout part and thus the rear edge of the card can be guided to the engagement part. In other words, even when the second guide part is inclined in such an attitude that the second guide part is sunk downward under the bottom face, the cutout part is capable of contacting with the under face of the card instead of the second guide part and thus the rear edge of the card can be guided to the engagement part.

In accordance with an embodiment, the second guide part may be formed such that a boundary between the second guide part and the engagement part is lower than a boundary between the second guide part and the first guide part, and the second guide part is formed in an inclined face directing in an opposite direction to the card stacked direction and the inclined face serves as the run-off part.

According to the structure as described above, the boundary between the second guide part and the engagement part is lower than the boundary between the second guide part and the first guide part in the opposite direction to the card stacked direction to form the run-off part. Therefore, even when the attitude of the card carrying-out member inclines in the card carrying-out direction, the run-off part absorbs the inclination to cause the under face of the card to come in contact with the second guide part, and the rear edge of the card can be guided to the engagement part.

According to the card carrying device in accordance with an embodiment of the present invention, other cards do not drop and overlap on the card at the lowest position that is being carried out, and the card at the lowest position on the way of being carried-out can be surely carried out by the carrying-out roller. Therefore, a card can be surely carried out one by one even when not only flat cards generating a large frictional force due to their stacking are stacked but also embossed cards are stacked.

Further, according to the card carrying device in accordance with an embodiment of the present invention, since a number of cards can be stacked in a stacker, the number of times of putting cards in the stacker can be reduced. In addition, the weight of other stacked cards is not applied to the card at the lowest position and thus the carrying-out roller for carrying the card at the lowest position is not required to have a holding force to overcome a frictional force generated by the weight of other stacked cards. As a result, since a force which is applied to the card at the lowest position can be reduced, malfunction such as disconnection of wire caused by applying an excessive force to the card can be prevented even when an IC card provided with an IC circuit in its inside is used.

Further, according to the card carrying device in accordance with another embodiment of the present invention, the card carrying-out member and the driving member with simple structure which do not cause the number of component parts and the size of device to increase are provided and the shift of the position and the attitude of a card due to vibration is prevented, and thus the card can be surely carried out.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a schematic sectional view showing a card carrying device in accordance with a first embodiment of the present invention in which a card at the lowest position is being pushed out from a stacker by a card pushing out-and-up member.

FIG. 2 is an enlarged view showing the pushing out-and-up member which is used in the card carrying device shown in FIG. 1.

FIG. 3 is a schematic enlarged cross-sectional view showing a time point when a card at the lowest position is separated from the pushing out-and-up member.

FIG. 4 is a schematic sectional view showing a state where a carrying-out roller carries the card at the lowest position out from the stacker while the pushing out-and-up member pushes cards except the card at the lowest position up from under side.

FIG. 5 is velocity diagrams showing relationships between carrying speeds of a drive sprocket which drives the pushing out-and-up member and a carrying-out roller and time.

FIG. 6 is a schematic sectional view showing a card carrying device in accordance with a second embodiment of the present invention.

FIG. 7 is an enlarged view showing a connecting state of a card carrying-out member with a chain which are used in the card carrying device shown in FIG. 6.

FIGS. 8(a) through 8(d) are schematic views showing a card carrying-out member in accordance with the second embodiment of the present invention. FIG. 8(a) is a side view showing the card carrying-out member, FIG. 8(b) is its rear view that is viewed from the arrow "P" direction in the drawing, FIG. 8(c) is its front view that is viewed from an opposite direction to the arrow "P" direction, and FIG. 8(d) is its top plan view that is viewed from a direction perpendicular to the arrow "P" direction.

FIG. 9 is a sectional view showing a driving mechanism of the card carrying device shown in FIG. 6 which is cut at the arrow "Q" position.

DETAILED DESCRIPTION OF THE PREFERRED EMBODIMENTS

A card carrying device in accordance with a first embodiment of the present invention will be described below with reference to the accompanying drawings. However, the present invention is not limited to the embodiments described below.

FIG. 1 is a schematic sectional view showing a card carrying device in accordance with a first embodiment of the present invention. A card carrying device 10 shown in FIG. 1 utilizes a card pushing out-and-up member 14 as a card carrying-out member which is integrally formed of a pushing-out member and a pushing-up member. A card 8 at the lowest position is pushed outside by the card pushing out-and-up member 14 from a stacker 12. FIG. 2 is an enlarged view showing the card pushing out-and-up member 14 which is used in the card carrying device 10 shown in FIG. 1. FIG. 3 is a schematic enlarged cross-sectional view showing a time point when the card 8 at the lowest position is separated from the card pushing out-and-up member 14. FIG. 4 is a schematic sectional view showing a state where a carrying-out roller 22 carries the card 8 at the lowest position out from the stacker 12 while the card pushing out-and-up member 14 pushes cards except the card 8 up from under side. In FIG. 3, the description of a control system such as stepping motors 40 and 42 and a control means 55 are omitted.

The card carrying device 10 in accordance with the first embodiment of the present invention includes, as shown in FIG. 1, a stacker 12 in which a plurality of cards 4 is stacked, the card pushing out-and-up member 14 for engaging with the rear edge of the card 8 at the lowest position of a plurality of the cards 4 to push the card 8 outside from the stacker 12, a carrying-out roller 22 for contacting with the card 8 pushed by the card pushing out-and-up member 14 to carry out the card 8 outside from the stacker 12, and the above-mentioned card pushing out-and-up member 14 for pushing other cards stacked on the card 8 up in an upper direction.

The stacker 12 is formed of a frame body that is made of aluminum base alloy or stainless steel in which a plurality of cards 4 is stacked and stored. The stacker 12 is arranged so as to be fixed to or detachably attached to the card carrying device as one part of a main body of the card carrying device. Flat cards 4 without embossment are stacked in the stacker 12. The card 4 may be an IC card. Further, the card 4 may be an embossed card.

The card pushing out-and-up member 14 is arranged so as to face the bottom part of the stacker 12 and structures the main body of the card carrying device. In other words, the card pushing out-and-up member 14 is disposed on the under-side of the stacker 12. In FIG. 1, the card pushing out-and-up member 14 in which the card pushing-out member and the card pushing-up member are integrated with each other is utilized. However, the card pushing-out member and the card pushing-up member may be respectively disposed as separate members.

The card pushing out-and-up member 14 serving as the card pushing-out member is moved so as to engage with the rear edge of the card 8 located at the lowest position of a plurality of the cards 4 to push the card 8 outside of the stacker 12. Further, as shown in FIG. 1, the card pushing out-and-up member 14 serving as the card pushing-up member works so as to push up other cards which are stacked on the card 8 in an upper direction during a time period after the carrying-out roller 22 comes in contact with the card 8 to start a carrying-out operation and before the card 8 has been carried out outside of the stacker 12 to finish the carrying-out operation. In other words, the card pushing out-and-up member 14 functions as a card pushing-out member until it horizontally moves between sprockets 30 and 32 to cause the card 8 at the lowest position to come in contact with the carrying-out roller 22. Further, the card pushing out-and-up member 14 functions as a card pushing-up member after it has horizontally moved between the sprockets 30 and 32 and begins to turn around the sprocket 32 disposed on a near side of the carrying-out roller 22 and, in addition, after the card 8 at the lowest position has come in contact with the carrying-out roller 22.

The card pushing out-and-up member 14 is attached, for example, to a driving mechanism such as chain 34 which is stretched between two sprockets 30 and 32. Specifically, the card pushing out-and-up member 14 structures a part of links of the chain 34 which is stretched between a drive sprocket 30 and a driven sprocket 32. A chain guide 35 for preventing the chain 34 and the card pushing out-and-up member 14 from going down is arranged on the under side of the chain 34. In accordance with the first embodiment shown in FIG. 1, two sprockets 30 and 32 are used but three or more sprockets may be used. The drive sprocket 30 is driven, for example, by a drive means such as a stepping motor 40.

As shown in FIG. 2, the card pushing out-and-up member 14 includes a pawl shaped pushing-out part 15 for engaging with the rear edge of a card and a pushing-up part 16 which is gradually and rearwardly protruded from the pushing-out part 15. The pushing-out part 15 is designed to have a height for being capable of engaging with only the card 8 at the lowest position. The pushing-out part 15 is designed in a height such that the pushing-out part 15 engages with only the card 8 at the lowest position and, while the card pushing out-and-up member 14 horizontally moves between the sprockets 30 and 32, the pushing-out part 15 engages with the rear edge of the card 8 to push the card 8 on a side of a card ejection port 21.

The pushing-up part 16 is formed in a gradually protruded shape. Therefore, the pushing-up part 16 acts so as to push other cards which are stacked on the card 8 at the lowest position slightly up in an upper direction even when the pushing-up part 16 moves horizontally between the sprockets 30 and 32. However, as shown in FIGS. 3 and 4, when the pushing out-and-up member 14 begins to turn around the sprocket 32 disposed on the carrying-out roller 22 side, the pushing-up part 16 pushes other cards stacked on the card 8 at the lowest position up in the upper direction and other cards become in an inclined state such that the portions on the carrying-out roller 22 side of other cards are lifted by the pushing-up part 16. For this purpose, the sprocket 32 on the carrying-out roller 22 side is preferably disposed at a position nearer on the carrying-out roller 22 side than the center position of the stacker 12 in the card carrying-out direction. As described above, in the case that the sprocket 32 is arranged nearer on the carrying-out roller 22 side than the center position in the card carrying-out direction of the stacker 12, when other cards are lifted by the pushing-up part 16 as the card pushing out-and-up member 14 turns around the sprocket 32, other cards become in an inclined state such that their end portions on the carrying-out roller 22 side are lifted by the pushing-up part 16, and thus only the card 8 at the lowest position can be surely carried out.

The carrying-out roller 22 is provided in the vicinity of an outer side of the card ejection port 21 which is disposed in a direction that the card 8 at the lowest position is pushed out. The carrying-out roller 22 is a roller for contacting with the card 8 at the lowest position which is being pushed out by the card pushing out-and-up member 14 as the card pushing-out member to carry the card 8 outside from the stacker 12. The carrying-out roller 22 is driven by a drive means such as the stepping motor 42. A roller having an elastic face such as rubber is preferably used as the carrying-out roller 22.

The carrying-out roller 22 is disposed at a position where the carrying-out roller 22 comes in contact with the card 8 at the lowest position that is being pushed out by the card pushing out-and-up member 14 as the card pushing-out member. In other words, the carrying-out roller 22 is disposed in a positional relationship that the card pushing out-and-up member 14 continues to push the card 8 at the lowest position till the card 8 comes in contact with the carrying-out roller 22. Therefore, the carrying-out roller 22 and the card pushing out-and-up member 14 are disposed in a relative position where the card pushing out-and-up member 14 does not work as the card pushing-up member before the card 8 comes in contact with the carrying-out roller 22. In other words, the card pushing out-and-up member 14 works as the card pushing-up member at the same time when the card 8 has come in contact with the carrying-out roller 22 and a carrying operation by the carrying-out roller 22 is started.

As shown in FIG. 1, a counter roller 24 which cooperates with the carrying-out roller 22 for carrying out the card 8 at the lowest position is preferably disposed at an opposite position to the carrying-out roller 22. The counter roller 24 presses the card 8 downward and applies a frictional force between the card 8 and the carrying-out roller 22. The card 8 is surely carried out by the frictional force. Similarly to the carrying-out roller 22, a roller having an elastic face such as rubber is preferably used as the counter roller 24.

A pair of facing members for passing only one piece of the card 8 at the lowest position when the card 8 is pushed to be carried to the carrying-out roller 22 may be preferably disposed on the carrying-out roller 22 side of the bottom part of the stacker 12. In accordance with the first embodiment shown in FIGS. 1, 3 and 4, a reference plate 18 is disposed along an inner wall of the stacker 12 and a reference plate 20 extending in the carrying-out direction is disposed on the under side of the stacker 12. A pair of the facing members (reference plates 18 and 20) are oppositely disposed in the vicinity of an inner side of the card ejection port 21 so as to have a specified gap space which allows only one piece of the card at the lowest position can be passed. The gap space is set to be in a dimension which is capable of passing through only one piece of the card 8 at the lowest position and prevents a card 6 just above the card 8 from passing through. The present invention is not limited to the above-mentioned embodiment and the gap space may be formed by using the reference plate 18 disposed on the upper side and a reference roller (not shown) disposed on the under side so as to face the reference plate 18. Alternatively, the gap space may be formed with two reference rollers (not shown) that face each other. Further, the reference plates 18 and 20 and the reference roller are preferably made of material which is hard to be worn.

According to the first embodiment, the card carrying device 10 includes drivers 46 and 48 for driving stepping motors 40 and 42 and a control means 50 which outputs a position command or a velocity command to the drivers 46 and 48.

Next, the card pushing out-and-up member, its operation and control mechanism will be described in detail below.

While the card pushing out-and-up member 14 that is attached to the chain 34 moves in parallel to the card 8 at the lowest position between the sprockets 30 and 32 by driving of the sprockets 30 and 32, that is, while the card pushing out-and-up member 14 moves from the position "T" to the position "P" shown in FIG. 1, the pushing-out part 15 of the card pushing out-and-up member 14 engages with the rear edge of the card 8 at the lowest position to move the card 8 in the right direction in FIG. 1 and the card 8 is pushed outside from the stacker 12. In this case, a gradually protruded upper face of the pushing-up part 16 of the card pushing out-and-up member 14 may be set in a slightly upper height so as to push other cards stacked on the card 8 up a little by the pushing-up part 16.

The card carrying device 10 shown in FIGS. 1, 3 and 4 is not provided a specially structured mechanism for inclining the card pushing out-and-up member 14. However, when the card pushing out-and-up member 14 attached to the chain 34 reaches to the driven sprocket 32 and begins to turn around it, the pushing-up part 16 located at an apart position from an imaginary line that connects the rotational center of the driven sprocket 32 and the pushing-out part 15 turns with a large diameter as shown by a trajectory 62. As a result, the pushing-up part 16 pushes other cards just on the card 8 at the lowest position up from the under side.

More specifically, link pins 36 which turnably connect respective links 37 of the chain 34 draw a trajectory 60 shown in the drawing and move around between the drive sprocket 30 and the driven sprocket 32. On the other hand, the pushing-up part 16 of the card pushing out-and-up member 14 draws the trajectory 62 and move around between the drive sprocket 30 and the driven sprocket 32.

The position "HP" shown in FIG. 1 is a position of the pushing-out part 15 in a stop state where the card carrying device 10 does not perform a card carrying-out operation. The position "T" is a position of the pushing-out part 15 where the pushing-out part 15 engages with the rear edge of the card 8 at the lowest position. Further, the position "P" is, as shown in FIGS. 3 and 4, a position where the pushing-up part 16 begins to move upward and push other cards stacked on the card 8 up when the card pushing out-and-up member 14 reaches to the driven sprocket 32 and begins to turn around. The position "D" is a position where the pushing-up part 16 begins to move away from the under face of the card 6 just on the card 8 at the lowest position when the pushing-up part 16 begins to move downward from the highest position after the driven sprocket 32 has further rotated.

As shown in FIGS. 3 and 4, while the pushing-up part 16 of the card pushing out-and-up member 14 is located between the position "P" and the position "D", the pushing-up part 16 pushes the card 6 just above the card 8 upward and thus a force due to the weight of stacked cards 4 is not applied to the card 8 at the lowest position. Accordingly, while the pushing-up part 16 of the card pushing out-and-up member 14 is located between the position "P" and the position "D", the carrying-out roller 22 can be easily carried out the card 8 at the lowest position outside from the stacker 12. According to the card carrying device 10 in accordance with the first embodiment, since the pushing-up part 16 pushes other cards stacked on the card 8 at the lowest position upward from the underside, the card 8 can be easily carried out even when a lot of cards 4 is loaded in the stacker 12.

Further, the card carrying device 10 in accordance with the first embodiment is preferably provided with a control mechanism by which, after the card pushing out-and-up member 14 as the card pushing-up member has pushed up other cards on the card 8 at the lowest position in an upper direction, the speed of rotation of the carrying-out roller 22 is increased to carry out the card 8 at the lowest position outside from the stacker 12. When the control mechanism described above is provided, the card 8 can be carried out outside from the stacker 12 with a short time and thus pushing-up time period by the card pushing out-and-up member 14 can be shortened.

In the following process, a specified information is recorded on the card 8 carried out from the stacker 12 or registration is performed on the card 8 such that the card 8 can be used by a user.

FIG. 5 is velocity diagrams showing relationships between carrying speeds of the drive sprocket 30 which drives the card pushing out-and-up member 14 and the carrying-out roller 22 and time.

When the card carrying device 10 is in a stopped state in which a carrying-out operation of a card 4 is not performed, the drive sprocket 30 is stopped with the card pushing out-and-up member 14 being located at the position "HP" and the carrying-out roller 22 is also stopped.

When the card carrying device 10 is driven to carry out the card 8 at the lowest position from the stacker 12, commands of rotational speed are outputted to the drivers 46 and 48 from the control means 50 to rotate the drive sprocket 30 and the carrying-out roller 22. As a command of rotational speed in this case, for example, a velocity value is outputted with which the carrying speed of the card 8 at the lowest position becomes "V1".

When the time has passed to the time point "Tt", the pushing-out part 15 of the card pushing out-and-up member 14 engages with the rear edge of the card 8 at the lowest position and the card 8 begins to be pushed toward the outside of the stacker 12.

When the time has further passed to the time point "Pt", the pushing-up part 16 begins to push up the card 6 on the card 8 at the lowest position from the underside while the card 8 is being pushed, and thus the card 8 begins to be released from the weight of a number of stacked cards. At this time, the card 8 at the lowest position comes in contact with the carrying-out roller 22. At this timing, the speed of rotation of the carrying-out roller 22 is increased to be "V2" to increase the carrying speed by the carrying-out roller 22. According to the control described above, the card 8 at the lowest position can be quickly carried out outside from the stacker 12 while the pushing-up part 16 has pushed up the card 6 positioned on the card 8 from the underside.

In accordance with an embodiment, at a timing when the card 8 at the lowest position comes in contact with the carrying-out roller 22, the speed of rotation of the drive sprocket 30 may be decreased such that the carrying speed of the pushing out-and-up member 14 becomes to be "V3". Also in this case, the card 8 can be carried out outside from the stacker 12 while the pushing-up part 16 has pushed up the card 6 located on the card 8 from the underside. In this case, the speed of rotation of the carrying-out roller 22 is not required to be increased to increase the carrying speed by the carrying-out roller 22 to be "V2", and the carrying speed of the card 8 may be remained to be "V1".

After that, till the time point "Dt" in FIG. 5, the carrying speed of the carrying-out roller 22 is set to be "V2" and the carrying speed of the drive sprocket 30 is set to be "V3" such that the card 8 is carried out from the stacker 12.

It is preferable that the carrying speed of the carrying-out roller 22 continues to be "V2" until the card 8 at the lowest position has passed through the carrying-out roller 22. After the card 8 has passed through the carrying-out roller 22, the carrying speed of the carrying-out roller 22 is set to be "V1" or the carrying-out roller 22 is stopped.

Next, a card carrying device in accordance with a second embodiment of the present invention will be described below with reference to the accompanying drawings.

FIG. 6 is a schematic sectional view showing a card carrying device in accordance with a second embodiment of the present invention. FIG. 7 is an enlarged side view showing a card carrying-out member 150 and a chain 121 which are used in the card carrying device 100 shown in FIG. 6. FIGS. 8(a) through 8(d) are views showing the card carrying-out member 150. FIG. 8(a) is its side view, FIG. 8(b) is its rear view that is viewed from a rear side, i.e., the arrow "P" direction in the drawing, FIG. 8(c) is its front view that is viewed from a front side, i.e., an opposite direction to the arrow "P" direction, and FIG. 8(d) is its top plan view that is viewed from a direction perpendicular to the arrow "P" direction. FIG. 9 is a sectional view showing a driving mechanism 108 of the card carrying device 100 shown in FIG. 6 which is cut at the arrow "Q" position.

As shown in FIG. 6, the card carrying device 100 in accordance with the second embodiment of the present invention includes a stacker 104 in which a plurality of cards 101 is stacked, a card carrying-out member 150 for engaging with the rear edge of a card 101a at the lowest position of a plurality of the cards 101 to carry the card 101a outside from the stacker 104, a gate opening 102 which is formed in a card carrying-out direction and, from which a card is carried out to the outside from the stacker 104, and a carrying-out roller 105 which comes in contact with the card 101a which is being carried out from the gate opening 102 by the card carrying-out member 150 to be further carried out the card 101a outside from the stacker 104.

The stacker 104 is formed of a frame body in which a plurality of cards 101 is stacked and stored. The stacker 104 is arranged so as to be fixed to or detachably attached to the card carrying device 100. A plurality of cards 101 to be issued is accommodated and stacked in the inside of the stacker 104. The card 101 is, for example, a flat PET card or an embossed card, which is capable of being accommodated in the stacker 104.

A bottom plate of the stacker 104 for stacking and accommodating a plurality of the cards 101 is formed at a bottom portion of the stacker 104. The bottom plate of the stacker 104 forms a boundary face between the stacker 104 and the driving mechanism 108 as shown in FIG. 6. An upper face of the bottom plate is a bottom face 103 on which the under surface of the card 101a at the lowest position slides when the card 101a is carried in a card carrying-out direction.

As shown in FIG. 9, an elongated opening 107 is formed in the bottom face 103. The elongated opening 107 is formed along a substantially center in a widthwise direction of the cards 101 which are stacked in the stacker 104 such that the card carrying-out member 150 is capable of protruding from the bottom face 103 and moving along the elongated opening 107 of the bottom face 103. The structure and operation of the card carrying-out member 150 will be described below.

The card carrying-out member 150 is arranged so as to face the bottom face 103. In other words, the card carrying-out member 150 is arranged on the under side of the stacker 104 and, when the card carrying-out member 150 protrudes from the bottom face 103 through the elongated opening 107, the card carrying-out member 150 engages with the rear edge of the card 101a at the lowest position of a plurality of stacked cards 101 to carry out the card 101a outside from the stacker 104.

The card carrying-out member 150 is attached to the chain 121 as a driving member which is stretched between two sprockets 120 and 120' with coupling pins 156. Specifically, as shown in FIG. 7, an inner side link 131 of the chain 121 is connected to a fixing part 155 of the card carrying-out member 150 by using the coupling pins 156 passing through fixing holes 155a (see FIG. 8(a)) of the card carrying-out member 150. In other words, the fixing part 155 of the card carrying-out member 150 is fixed to the chain 121 so as to structure one part of an outer link 132 of the chain 121. Alternatively, the card carrying-out member 150 may be fixed to the chain 121 such that the fixing part 155 of the card carrying-out member 150 is disposed on an outer side of the inner side link 131 and the outer side link 132 which are connected to each other and the coupling pins 156 are passed through the fixing holes 155a.

The drive sprocket 120 is driven by a drive means such as a stepping motor 123. A driving force of the drive sprocket 120 is transmitted to the driven sprocket 120' through the chain 121 and the driven sprocket 120' is rotated. In this manner, the card carrying-out member 150 moves with the chain 121 in a parallel manner. A chain guide 122 is provided under the chain 121 for preventing the chain 121 and the card carrying-out member 150 from shifting down to the underside of the bottom face 103. The driving mechanism 108 for driving the card carrying-out member 150 comprises the chain 121 as a driving member, the sprockets 120 and 120', the chain guide 122, and the stepping motor 123 as a drive source for the drive sprocket 120.

The card carrying-out member 150 moves in parallel to the bottom face 103 in a direction of the gate opening 102 (card carrying-out direction) between the sprockets 120 and 120'. As shown in FIG. 7, the card carrying-out member 150 includes a pawl shaped engagement part 151 for engaging with a rear edge of a card. The engagement part 151 protrudes from the bottom face 103 through the elongated opening 107 to cause the engaging face 151a to engage with the rear edge of the card 101a at the lowest position while the card carrying-out member 150 moves in parallel to the bottom face 103 between the sprockets 120 and 120'. Then, when the tip end portion of the card 101a at the lowest position reaches to the gate opening 102, the card 101a is pushed outside from the stacker 104.

A counter roller 106 is disposed at a position so as to face the carrying-out roller 105 for carrying out the card 101a at the lowest position in cooperation with the carrying-out roller 105. Since the counter roller 106 presses the card 101a which is being carried-out, a frictional force is applied between the card 101a and the carrying-out roller 105, and thus the card 101a is carried out without slipping between the rollers.

Next, the structure of the card carrying-out member 150 will be described below with reference to FIGS. 8(a) through 8(d).

FIGS. 8(a) through 8(d) are explanatory enlarged views showing the card carrying-out member 150 in accordance with the second embodiment. The card carrying-out member 150 is formed in a molded manner by using resin material, and the card 101a at the lowest position of a plurality of stacked cards 101 is carried out one by one in a card carrying-out direction by the card carrying-out member 150 from the stacker 104. In accordance with the second embodiment, as shown in FIG. 7 and FIGS. 8(a) through 8(d), the card carrying-out member 150 includes a first guide part 152, a second guide part 153, the engagement part 151, and the fixing part 155 for attaching the card carrying-out member 150 to the chain 121 as a driving member. Further, as shown in FIGS. 8(b) through 8(d), a width in a card widthwise direction of the carrying-out part 170 is formed wider than a width in the card widthwise direction of the fixing part 155.

As shown in FIG. 9, the card carrying-out member 150 is fixed to the chain 121 in a cantilevered manner by using the fixing part 155 which extends in an opposite direction to a card stacked direction on one side in the card widthwise direction of the card carrying-out member 150. More specifically, the fixing part 155 is attached to the inner side link 131 of the chain 121 through the coupling pins 156 with a snap ring 134, or the fixing part 155 is attached on the outer side of the inner side link 131 and the outer side link 132 through coupling pins 156 with a snap ring 134.

The inner side links 131 and the outer side links 132 of the chain 121 are turnably connected with each other with coupling pins 156. Combinations of the inner side links 131 and the outer side links 132 are continuously connected to structure the chain 121. A driving force of the drive sprocket 120 is transmitted to the chain 121 and the chain 121 goes around between the sprockets 120 and 120'. The card carrying-out member 150 is fixed to the chain 121 through the fixing part 155 of the card carrying-out member 150 and thus the card carrying-out member 150 moves in a card carrying-out direction and in its opposite direction in a reciprocated manner.

The chain 121 is structured so as to be freely turnable and is provided with plays. Since the chain 121 is provided with plays due to the turning, the card carrying-out member 150 is permitted with a play in a card carrying-out direction shown by the arrow "w-z" in FIG. 7 (the arrow "w-z" direction) and a play in a card widthwise direction shown by the arrow "x-y" in FIG. 9 (the arrow "x-y" direction). Further, in the embodiments described above, the chain 121 is used as a driving member, but a belt having elasticity or the like may be used.

In addition, since the card carrying-out member 150 is molded by using resin material, the card carrying-out member 150 is provided with flexibility and thus further provided with plays in the arrow "w-z" direction and the arrow "x-y" direction. Therefore, even when an attitude of the card carrying-out member 150 becomes unstable due to a load of a plurality of stacked cards 101 or vibration of a drive source such as the stepping motor 123, the attitude of the card carrying-out member 150 can be corrected by the above-mentioned plays of the card carrying-out member 150.

The card carrying-out member 150 is provided with an engagement part 151 on a rear side in the arrow "P" as shown in FIG. 6. The engagement part 151 protrudes from the bottom face 103 toward a stacked direction of a plurality of the cards to cause its engaging face 151a, which is a vertical face of the engagement part 151 in a card widthwise direction, to engage with a rear edge of the card 101a at the lowest position and to carry out the card 101a in the card carrying-out direction. Further, the engaging face 151a of the engagement part 151 is formed so as to protrude in a height such that only the card 101a at the lowest position is capable of engaging with the engaging face 151a. Further, the engaging face 151a engages with the rear edge of the card 101a while the card carrying-out member 150 moves between the sprockets 120 and 120'.

As shown in FIG. 7 and FIGS. 8(a) through 8(d), the card carrying-out member 150 is provided with a first guide part 152 which is formed on an opposite side in the card carrying-out direction to the engagement part 151 from the tip end part 159 for causing the card 101a at the lowest position to slide and guide the rear edge of the card 101a toward the engaging face 151a. The first guide part 152 is formed in a plane which intersects a plane including the bottom face 103 from an opposite side to the card stacked direction. The first guide part 152 is formed in an inclined face which extends in a direction of the engagement part 151 and in a card stacked direction so as to be capable of sliding the card 101a.

As shown in FIG. 7, the first guide part 152 is provided with a plane which intersects a plane including the bottom face 103 and extends further downward from the bottom face 103. Therefore, even when the card carrying-out member 150 is inclined in the arrow "w-y" direction (the card carried-out direction) due to the play of the chain 121, the tip end part 159 of the card carrying-out member 150 does not come in contact with the rear edge of the card 101a at the lowest position. Accordingly, the card 101a slides on the first guide part 152 as the card carrying-out member 150 moves and successively the card 101a can be moved to the second guide part 153. The first guide part 152 is provided with an inclination such that the rear edge of the card 101a is guided to be away (in other words, the card stacked direction) from the plane including the bottom face 103 as the card 101a approaches to the engagement part 151.

As described above, the tip end part 159 of the card carrying-out member 150 is located so as to be extended downward from the plane including the bottom face 103. Therefore, even when the card carrying-out member 150 inclines in the arrow "w-z" direction (in other words, card carrying-out direction), and especially even when the card carrying-out member 150 inclines in a direction of the arrow "w" and the engagement part 151 is located under the plane including the bottom face 103, the tip end part 159 does not protrude from the bottom face 103. Accordingly, even when the card carrying-out member 150 inclines in the arrow "w-z" direction (in other words, the card carrying-out direction), the card 101a at the lowest position does not ride on the card carrying-out member 150 and thus a card can be surely carried out.

In addition, the inclination angle of the first guide part 152 is set to be an angle which is determined by a numerical value calculated from the coefficient of friction (F) of the material (p) which forms a card 101 and the material (μ) which forms the card carrying-out member 150. In this embodiment, material of the card 101 is vinyl chloride and material of the card carrying-out member 150 is polyacetal, and the coefficient of friction (F=μp) becomes 0.2-0.3 at the maximum. According to the coefficient of friction described above, the inclination angle of the first guide part 52 becomes to be about 15°.

In this embodiment, when a frictional force occurring between the card 101a at the lowest position which is subjected to a weight (p) of the cards 101 stacked in the stacker 104 and the bottom face 103 is set to be (A), and when a frictional force occurring between the rear edge of the card 101a which is subjected to the weight (p) of the cards 101 and the first guide part 152 is set to be (B), the relationship of the two frictional forces is set to be (A)>(B). When the frictional forces occurring at the two points are set to be the above-mentioned relationship, the card 101a at the lowest position moves while it slides on the first guide part 152 and the rear edge of the card is engaged with the engaging face 151a of the engagement part 151. The inclination of the first guide part 152 is formed such that a card 101 is capable of sliding on the card carrying-out member 150 in consideration of the frictional forces occurring these two points, the weight of cards 101 stacked in the stacker 104, and the plays of the card carrying-out member 150 occurred by vibration which is caused by driving the card carrying-out member 150.

The second guide part 153 is formed such that the card 101a at the lowest position that is guided from the first guide part 152 is guided to cause the rear edge of the card 101a to engage with the engagement part 151.

The second guide part 153 is preferably formed in a smaller inclination angle to the bottom face 103 than the inclination angle of the first guide part 152 and, as shown in FIG. 7, the inclination of the second guide part 153 is preferably set in a minus angle which is in an opposite direction to the card stacked direction. In other words, the second guide part 153 is preferably formed in a small inclination angle such that a distance between the bottom face 103 and the second guide part 153 is smaller than that between the bottom face 103 and the first guide part 152.

In FIG. 7, a boundary between the first guide part 152 and the second guide part 153 is indicated with a symbol "m" and a boundary between the second guide part 153 and the engagement part 151 is indicated with a symbol "n". In other words, the relationship between the height shown by the symbol "m" and the height shown by the symbol "n" is set to be "m">"n". The card carrying-out member 150 is formed so as to have the height as described above in the card carrying-out direction. Therefore, even when the card carrying-out member 150 is inclined in the card carrying-out direction, the under face of the card 101a at the lowest position comes in contact with the portion of the symbol "m" and the weight of cards is applied to the card carrying-out member 150, and thus the attitude of the second guide part 153 and the card carrying-out member 150 can be corrected in a substantially parallel attitude to the bottom face 103.

Further, when the card 101a at the lowest position is guided by the second guide part 153, i.e., by a run-off part formed between the portion of the symbol "m" and the portion of the symbol "n", the rear edge of the card 101a can be guided to the engaging face 151a. Therefore, even when the card carrying-out member 150 is inclined in the arrow "w-z" direction (in other words, the card carrying-out direction), the rear edge of the card can be engaged with the engaging face 151a of the engagement part 151 to carry out the card. As described above, the second guide part 153 of the card carrying-out member 150 is formed with a minus inclination angle which is in an opposite direction to the card stacked direction, and thus the second guide part 153 functions as a run-off part for preventing the rear edge of the card 101a from disengaging from the engagement part 151.

Further, as shown in FIG. 8, the card carrying-out member 150 is provided with the first guide part 152 on one side of the center line along the card carrying-out direction and, on the other side of the center line, a cutout part 158 is provided which is inclined and extended underside from the first guide part 152 in a direction opposite to the card stacked direction.

In other words, the card carrying-out member 150 is subjected to the weight of a plurality of cards 101 stacked in the stacker 104 and to the effect of vibration due to carrying of a card and, in addition, the card carrying-out member 150 is fixed to the chain 121 as a driving member which supports the card carrying-out member 150 through the fixing part 155 in a cantilevered manner. Therefore, it is difficult to maintain the attitude of the card carrying-out member 150 in a card carrying-out operation and thus inclination may occur. For example, when the card carrying-out member 150 inclines in a direction of the arrow "x" such that the under face of the card 101a at the lowest position does not contact with the second guide part 153, in other words, when the card carrying-out member 150 inclines to the extent that the second guide part 153 sank to an under side of the bottom face 103, the rear edge of the card 101a may not be guided to the engaging face 151a.

When the card carrying-out member 150 is inclined to the attitude as described above, the cutout part 158 is moved to a position where the cutout part 158 comes into contact with the under face of the card 101a at the lowest position instead of the second guide part 153. The cutout part 158 is formed in an inclined face to guide the rear edge of the card 101a to the engagement part 151, in other words, to maintain an attitude which is approximately parallel to the bottom face 103 to be capable of coming into contact with the under face of the card 101a. Therefore, the cutout part 158 contacts with the card 101a to guide the rear edge of the card 101a to the engaging face 151a. As described above, when the card carrying-out member 150 inclines in the arrow "x-y" direction, the cutout part 158 is formed as a run-off part for maintaining the card 101a so as not to incline along with the card carrying-out member 150.

A shoulder part 157 is formed at a boundary between the second guide part 153 and the cutout part 158. The shoulder part 157 is formed so as to contact with the under face of the card 101a when the card carrying-out member 150 is inclined in the "x" direction and, in the case that its inclination is in a degree that the second guide part 153 does not sink on the under side of the bottom face 103. The shoulder part 157 moves in a direction of the arrow "y" when the weight of the card 101a at the lowest position and a plurality of stacked cards 101. Therefore, the card carrying-out member 150 is pushed back from the inclined state in the arrow "x" direction to the arrow "y" direction such that the attitude of the card carrying-out member 150 is corrected so as to be approximately parallel to the bottom face 103, and thus the card 101a at the lowest position is capable of sliding and the rear edge of the card 101a is guided to the engaging face 151a.

In accordance with this embodiment, when the card carrying-out member 150 inclines in the arrow "y" direction, the card carrying-out member 150 comes into contact with the chain guide 122 and its inclination is regulated by the chain guide 122. Therefore, the attitude of the card carrying-out member 150 can be corrected such that the under face of the card 101a is slidable on the second guide part 153.

The engagement part 151 has a groove part 154 at a boundary between the second guide part 153 and the engagement part 151. As shown by the symbol "l" in FIG. 8(a), the groove part 154 is formed by cutting in a direction perpendicular to the card carrying-out direction so as to be continuous with the engagement part 151 and the engaging face 151a, and the groove part 154 is a groove portion formed in a card widthwise direction in the card carrying-out member 150.

The rear edge of the card 101a at the lowest position can be engaged with the engagement part 151 at a right angle by providing with the groove part 154 even when the card carrying-out member 150 inclines in the arrow "w" direction to cause the card 101a to be guided in an attitude that the card 101a is separated from the first guide part 152 and the second guide part 153 due to the inclination of the card carrying-out member 150. In other words, as shown in FIG. 7, the groove part 154 is formed lower than a boundary shown by the symbol "n" between the second guide part 153 and the engagement part 151 and is cut continuously with the engagement part 151 and the engaging face 151a so as to be extended to the underside of a plane including the bottom face 103.

Therefore, even when the card carrying-out member 150 inclines in the arrow "w" direction and the card 101a at the lowest position is guided in an attitude that the engagement part 151 is sank downward from the bottom face 103, the rear edge of the card 101a can be engaged with the engaging face 151a.

Next, an operation of carrying out of the card 101 in the card carrying device 100 will be described in detail below.

As shown in FIG. 6, the drive sprocket 120 is driven by a driving force of the stepping motor 123 and the driven sprocket 120' is rotated by the driving force of the drive sprocket 120. Then, the card carrying-out member 150 attached to the chain 121 which is stretched between the sprockets 120 and 120' moves toward the gate opening 102 from the position "b" shown in FIG. 6 in parallel to the bottom part 103 between the sprockets 120 and 120'.

When the card carrying-out member 150 is moved, the rear edge of the card 101a at the lowest position of a plurality of stacked cards 101 comes in contact with the guide part 152. After that, as the card carrying-out member 150 further moves toward the card carrying-out direction, an under face nearer to the center portion than the rear edge of the card 101a slides on the upper face of the first guide part 152 of the card carrying-out member 150. Next, the card 101a slides on the upper face of the second guide part 153 to cause the rear edge of the card to be guided to engage with the engaging face 151a.

The card carrying-out member 150 attached to the chain 121 is moved by the sprockets 120 and 120' between the sprockets 120 and 120' in a parallel manner, and the engagement part 151a of the card carrying-out member 150 engages with the rear edge of the card 101a at the lowest position to carry out the card 101a outside from the stacker 104. Next, the card 101a passes through the gate opening 102 and is pinched between the carrying-out roller 105 and the counter roller 106 which are disposed on the outer side of the stacker 104. When the card 101a is completely carried out through rotation of the rollers to the outer side of the stacker 104, the carrying-out operation of the card carrying-out member 150 is finished. When the card carrying-out member 150 has finished the carrying-out operation, the card carrying-out member 150 moves in parallel to the bottom face 103 between the sprockets 120 and 120' toward a direction away from the gate opening 102, and the card carrying-out member 150 goes around the drive sprocket 120 as shown at the position "a" and the position "b" in FIG. 6. Then, when the card carrying-out member 150 is moved to be apart from the drive sprocket 120, as shown in FIG. 6, the card carrying-out member 150 engages with the rear edge of a next card 101a at the lowest position and a card carrying-out operation is performed again.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card carrying device for use with a plurality of cards comprising:
   a stacker in which the plurality of cards may be stacked;
   a card pushing-out member driven by a first driving mechanism and arranged so as to face a bottom part of the stacker for engaging with a rear edge of a card at a lowest position of the plurality of the cards to push the card at the lowest position outside from the stacker;

a carrying-out roller which is driven by a second driving mechanism and is disposed in a direction that the card at the lowest position is carried out so as to be capable of coming in contact with the card at the lowest position which is being pushed out by the card pushing-out member to carry the card outside from the stacker;

a card pushing-up member which is arranged so as to face a bottom part of the stacker for pushing up other cards stacked on the card at the lowest position in an upper direction in a period after the carrying-out roller comes in contact with the card at the lowest position to start a carrying-out operation and before the card at the lowest position has been carried outside from the stacker; and a control mechanism structured to control so that the rotating speed of the carrying-out roller driven by the second driving mechanism is set to be higher than the carrying speed of the card pushing-out member driven by the first driving mechanism after the card pushing-up member has pushed up other cards in an upper direction.

2. The card carrying device according to claim 1, wherein the card pushing-out member and the card pushing-up member are integrated with each other to be formed as one piece of a card pushing out-and-up member.

3. The card carrying device according to claim 2, wherein the card pushing-up member is formed on a rear side of the card pushing-out member in a card pushing-out direction.

4. The card carrying device according to claim 3, wherein one piece of the card pushing out-and-up member includes a pawl shaped pushing-out part for engaging with a rear edge of the card at the lowest position and a pushing-up part which is gradually protruded rearward from the pushing-out part, and the card pushing out-and-up member functions as a card pushing-out member until the card at the lowest position comes in contact with the carrying-out roller and functions as a card pushing-up member after the card at the lowest position has come in contact with the carrying-out roller.

5. The card carrying device according to claim 2, wherein the driving mechanism comprises a chain which is stretched between a plurality of sprockets and to which the card pushing out-and-up member is attached, wherein, when the card pushing out-and-up member moves between the sprockets, the card pushing out-and-up member functions as a card pushing-out member and, after the card pushing out-and-up member has moved between the sprockets as the card pushing-out member and when the card pushing out-and-up member turns around a sprocket which is disposed on a near side to the carrying-out roller, the card pushing out-and-up member functions as a card pushing-up member.

6. The card carrying device according to claim 1, further comprising a pair of facing members which is disposed on the carrying-out roller side of the bottom part of the stacker for permitting only one piece of the card at the lowest position to pass through when the card at the lowest position is pushed to the carrying-out roller.

7. A card carrying device for use with a plurality of cards comprising:

a stacker in which the plurality of cards may be stacked; and a card carrying-out member which is disposed so as to face an aperture of a bottom face of the stacker for engaging with a rear edge of a card at a lowest position of the plurality of the cards to carry out the card at the lowest position from a gate opening of the stacker;

wherein the card carrying-out member comprises:

an engagement part which is capable of protruding into the stacker from the bottom face, the engagement part comprising an engaging face structured to abut with the rear edge of the card at the lowest position for pushing the rear edge of the card;

a first guide part which is formed in a first guide face intersecting the bottom face of the stacker and structured to guide the rear edge of the card at the lowest position toward the engaging face; and a second guide part which is formed in a second guide face with an inclined angle that is smaller than an inclined angle of the first guide face to the bottom face of the stacker and structured to guide the rear edge of the card at the lowest position toward the engaging face from the first guide face;

wherein the first guide face is provided on a front side of the card carrying-out member in a card-carrying direction, the second guide face is provided on a rear side of the first guide face in the card-carrying direction, and the engaging face is provided on a rear side of the second guide face parting the card-carrying direction;

the first guide face and the second guide face intersect a plane including the bottom face;

a boundary point between the first guide face and the second guide face is positioned at a level above the bottom face; and a length of the first guide face is longer than a length of the second guide face.

8. The card carrying device according to claim 7, further comprising a driving member having a play for moving the card carrying-out member in a card carrying-out direction, wherein the card carrying-out member is attached to the driving member so as to be capable of wobbling due to the play of the driving member in a card carrying-out direction and in a card widthwise direction, and the card carrying-out member is provided with a run-off part for preventing the rear edge of the card from disengaging with the engagement part accompanied by the wobbling in the card carrying-out direction and in the card widthwise direction.

9. The card carrying device according to claim 8, wherein the driving member is a chain which is structured with a plurality of connected links and the card carrying-out member is attached to the chain.

10. The card carrying device according to claim 7, wherein the second guide part is formed on one side of the card carrying-out member with respect to a center line along the card carrying-out direction, and a cutout part which is inclined toward underside from the second guide part is formed on an other side of the card carrying-out member with respect to the center line along the card carrying-out direction.

11. The card carrying device according to claim 7, wherein the second guide part is formed such that a boundary between the second guide part and the engagement part is lower than a boundary between the second guide part and the first guide part, and the second guide part is formed in an inclined face directing in an opposite direction to the card stacked direction.

* * * * *